US012218445B2

(12) United States Patent
Amemori et al.

(10) Patent No.: US 12,218,445 B2
(45) Date of Patent: Feb. 4, 2025

(54) FEMALE MULTIPOLAR CONNECTOR AND MULTIPOLAR CONNECTOR SET EQUIPPED THEREWITH

(71) Applicant: Murata Manufacturing Co., Ltd., Kyoto-fu (JP)

(72) Inventors: Yuma Amemori, Nagaokakyo (JP); Takahiro Jodo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 272 days.

(21) Appl. No.: 17/579,456

(22) Filed: Jan. 19, 2022

(65) Prior Publication Data

US 2022/0140512 A1 May 5, 2022

Related U.S. Application Data

(63) Continuation of application No. PCT/JP2020/029332, filed on Jul. 30, 2020.

(30) Foreign Application Priority Data

Aug. 1, 2019 (JP) ................................ 2019-142198

(51) Int. Cl.
*H01R 12/71* (2011.01)
*H01R 13/658* (2011.01)
(Continued)

(52) U.S. Cl.
CPC ........... *H01R 12/71* (2013.01); *H01R 13/658* (2013.01); *H01R 13/6581* (2013.01);
(Continued)

(58) Field of Classification Search
CPC .. H01R 12/71; H01R 13/658; H01R 13/6581; H01R 12/712; H01R 12/716;
(Continued)

(56) References Cited

U.S. PATENT DOCUMENTS

| | | | | |
|---|---|---|---|---|
| 5,387,134 A | 2/1995 | Bryce et al. | | |
| 2006/0141811 A1* | 6/2006 | Shichida | ................ | H01R 24/50 439/63 |
| 2021/0111521 A1* | 4/2021 | Amemori | ............... | H01R 12/73 |

FOREIGN PATENT DOCUMENTS

| | | |
|---|---|---|
| CN | 1797868 A | 7/2006 |
| CN | 102138371 A | 7/2011 |

(Continued)

OTHER PUBLICATIONS

International Search Report issued in PCT/JP2020/029332; mailed Sep. 1, 2020.

(Continued)

*Primary Examiner* — Justin M Kratt

(74) *Attorney, Agent, or Firm* — Studebaker & Brackett PC

(57) ABSTRACT

A female multipolar connector includes a first internal terminal; a second internal terminal; a first external terminal; and a first insulator that holds the first external terminal. The first internal terminal is a male type and is arranged on an inner side portion of the first external terminal. The second internal terminal is a female type and is arranged on an outer side portion of the first external terminal. A height of the first external terminal is greater than a height of the first internal terminal. The first external terminal is the female type.

26 Claims, 6 Drawing Sheets

(51) Int. Cl.

| | |
|---|---|
| ***H01R 13/6581*** | (2011.01) |
| *H01R 13/02* | (2006.01) |
| *H01R 13/40* | (2006.01) |
| *H01R 13/6585* | (2011.01) |
| *H01R 13/6591* | (2011.01) |
| *H01R 13/6594* | (2011.01) |

(52) U.S. Cl.
CPC .......... *H01R 12/712* (2013.01); *H01R 12/716* (2013.01); *H01R 13/02* (2013.01); *H01R 13/40* (2013.01); *H01R 13/6585* (2013.01); *H01R 13/6591* (2013.01); *H01R 13/6594* (2013.01)

(58) Field of Classification Search
CPC .... H01R 13/02; H01R 13/40; H01R 13/6585; H01R 13/6591; H01R 13/6594

See application file for complete search history.

(56) References Cited

FOREIGN PATENT DOCUMENTS

| | | | |
|---|---|---|---|
| CN | 107809037 | A | 3/2018 |
| CN | 111490409 | A | 8/2020 |
| JP | H08-000527 | U | 3/1996 |
| JP | 3086881 | U | 7/2002 |
| JP | 2006-185773 | A | 7/2006 |
| JP | 2016-12553 | A | 1/2016 |
| JP | 2018181820 | A | 11/2018 |
| JP | 2020-123438 | A | 8/2020 |
| WO | 2017/053149 | A1 | 3/2017 |
| WO | 2020/003731 | A1 | 1/2020 |
| WO | 2020/039666 | A1 | 2/2020 |
| WO | 2020/040004 | A1 | 2/2020 |

OTHER PUBLICATIONS

Written Opinion of the International Searching Authority issued in PCT/JP2020/029332; mailed Sep. 1, 2020.

* cited by examiner

FEMALE MULTIPOLAR CONNECTOR AND MULTIPOLAR CONNECTOR SET EQUIPPED THEREWITH

CROSS-REFERENCE TO RELATED APPLICATIONS

This application claims benefit of priority to International Patent Application No. PCT/JP2020/029332, filed Jul. 30, 2020, and to Japanese Patent Application No. 2019-142198, filed Aug. 1, 2019, the entire contents of each are incorporated herein by reference.

BACKGROUND

Technical Field

The present disclosure relates to a female multipolar connector and a multipolar connector set equipped therewith.

Background Art

Multipolar connector sets that are configured by fitting a female multipolar connector and a male multipolar connector to each other have been conventionally disclosed, as described, for example, in Japanese Unexamined Patent Application Publication No. 2016-12553.

The female multipolar connector of Japanese Unexamined Patent Application Publication No. 2016-12553 includes a plurality of internal terminals, an external terminal that surrounds the plurality of internal terminals, and an insulator that holds the internal terminals and the external terminal. Both of the internal terminals and the external terminal are the female type.

The male multipolar connector also similarly includes a plurality of internal terminals, an external terminal that surrounds the plurality of internal terminals, and an insulator that holds the internal terminals and the external terminal. Both of the internal terminals and the external terminal are the male type.

SUMMARY

However, when terminals of a multipolar connector include a plurality of terminals used for signals having mutually-different frequencies, interference between a terminal for a high frequency signal and a terminal for a low frequency signal is required to be suppressed. Meanwhile, a high frequency multipolar connector is required to be further reduced in size, especially reduced in height so as to meet size reduction and functionality enhancement of mobile phones, PCs, tablets, and the like.

Accordingly, the present disclosure provides a female multipolar connector and a multipolar connector set that realize suppression of inter-terminal interference and reduction in height thereof.

Therefore, a female multipolar connector according to the present disclosure includes a first internal terminal; a second internal terminal; a first external terminal that surrounds the first internal terminal; and a first insulator that holds the first internal terminal, the second internal terminal, and the first external terminal. A height of the first external terminal is greater than a height of the first internal terminal. The first internal terminal is a male type, the second internal terminal is a female type, and the first external terminal is the female type.

A multipolar connector set according to the present disclosure includes the female multipolar connector; and a male multipolar connector that is fitted to the female multipolar connector. The male multipolar connector includes a third internal terminal that is the female type and is fitted to the first internal terminal; a fourth internal terminal that is the male type and is fitted to the second internal terminal; a second external terminal that is the male type and is fitted to the first external terminal; and a second insulator that holds the third internal terminal, the fourth internal terminal, and the second external terminal. A height of the second external terminal is greater than a height of the third internal terminal.

According to the female multipolar connector and multipolar connector set of the present disclosure, suppression of inter-terminal interference and reduction in height thereof can be realized.

DETAILED DESCRIPTION

Figure 1A:
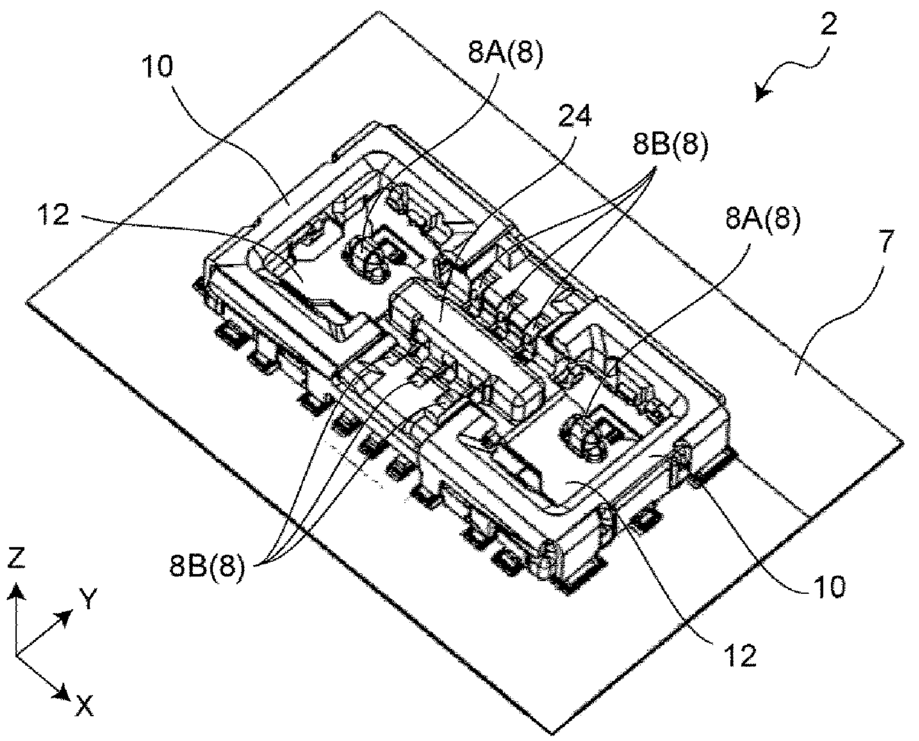
FIG. 1A is a perspective view of an upper surface side of a female multipolar connector according to an embodiment.

According to a first aspect of the present disclosure, there is provided a female multipolar connector including a first internal terminal; a second internal terminal; a first external terminal; and a first insulator that holds the first external terminal. The first internal terminal is a male type and is arranged on an inner side portion of the first external terminal, the second internal terminal is a female type and is arranged on an outer side portion of the first external terminal, a height of the first external terminal is greater than a height of the first internal terminal, and the first external terminal is the female type.

According to this configuration, the reduction in height of the female multipolar connector can be realized while suppressing the interference between the first internal terminal and the second internal terminal.

According to a second aspect of the present disclosure, there is provided the female multipolar connector according to the first aspect in which the height of the first internal terminal is lower than a height of the first insulator. According to this configuration, damaging of the first internal terminal can be suppressed.

According to a third aspect of the present disclosure, there is provided the female multipolar connector according to the first or second aspect in which the height of the first insulator is lower than the height of the first external terminal. According to this configuration, damaging of the first internal terminal can be suppressed.

According to a fourth aspect of the present disclosure, there is provided the female multipolar connector according to any one of the first to third aspects in which the height of the first internal terminal is lower than a height of the second internal terminal. According to this configuration, damaging of the first internal terminal can be suppressed.

According to a fifth aspect of the present disclosure, there is provided the female multipolar connector according to any one of the first to fourth aspects in which the first internal terminal is connected to a signal line that transmits a signal of a higher frequency than that of the second internal terminal. According to this configuration, the first internal terminal that easily generates a noise is surrounded by the first external terminal and therefore, the interference between the first internal terminal and the second internal terminal can be effectively suppressed.

According to a sixth aspect of the present disclosure, there is provided the female multipolar connector according to any one of the first to fifth aspects in which the first internal terminal is connected to a signal line that transmits a millimeter wave signal. According to this configuration, the first internal terminal that easily generates a noise is surrounded by the first external terminal and therefore, the interference between the first internal terminal and the second internal terminal can be effectively suppressed.

According to a seventh aspect of the present disclosure, there is provided the female multipolar connector according to any one of the first to sixth aspects in which the first external terminal includes a protrusion portion extending in an extending direction of the first internal terminal between the first internal terminal and the second internal terminal in plan view. According to this configuration, a space for arranging an insulator and the like of a male multipolar connector can be secured between the first internal terminal and the second internal terminal while effectively suppressing the interference between the first internal terminal and the second internal terminal.

According to an eighth aspect of the present disclosure, there is provided a multipolar connector set including the female multipolar connector according to any one of the first to seventh aspects; and a male multipolar connector that is fitted to the female multipolar connector. The male multipolar connector includes a third internal terminal that is the female type and is fitted to the first internal terminal; a fourth internal terminal that is the male type and is fitted to the second internal terminal; a second external terminal that is the male type and is fitted to the first external terminal; and a second insulator that holds the third internal terminal, the fourth internal terminal, and the second external terminal, and a height of the second external terminal is greater than a height of the third internal terminal.

According to this configuration, a similar advantageous effect to that of the female multipolar connector according to the first aspect can be exerted.

An embodiment of the present disclosure will be described in detail below with reference to the accompanying drawings.

Embodiment

Figure 1B:
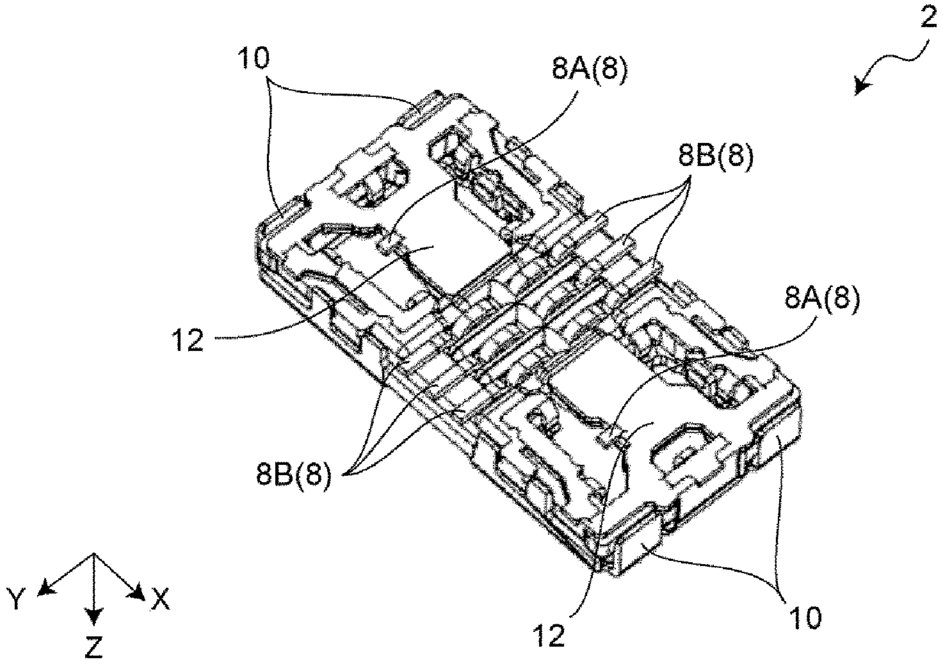
FIG. 1B is a perspective view of a lower surface side of the female multipolar connector according to the embodiment.
Figure 1C:
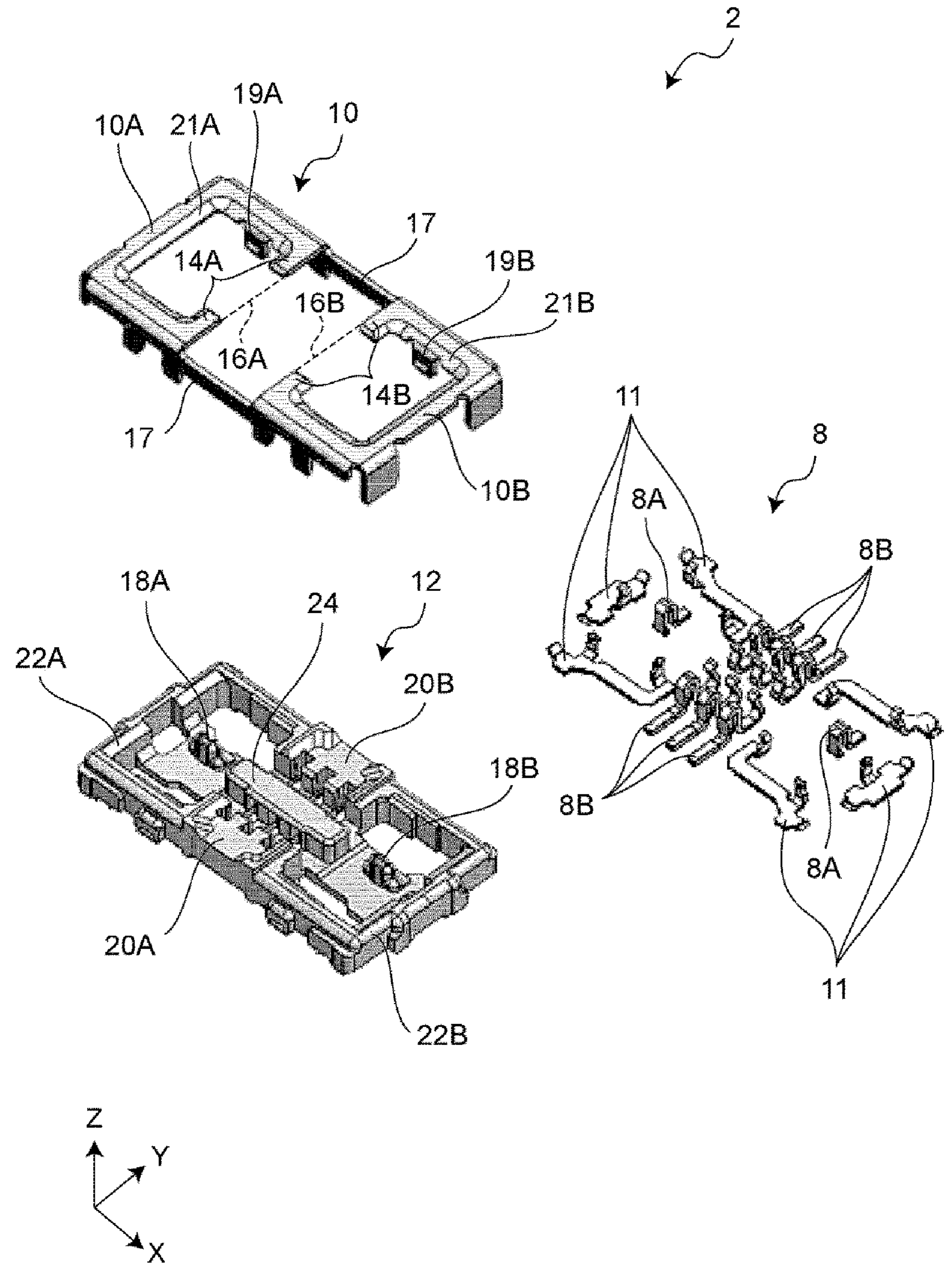
FIG. 1C is an exploded perspective view of the female multipolar connector according to the embodiment.
Figure 2A:
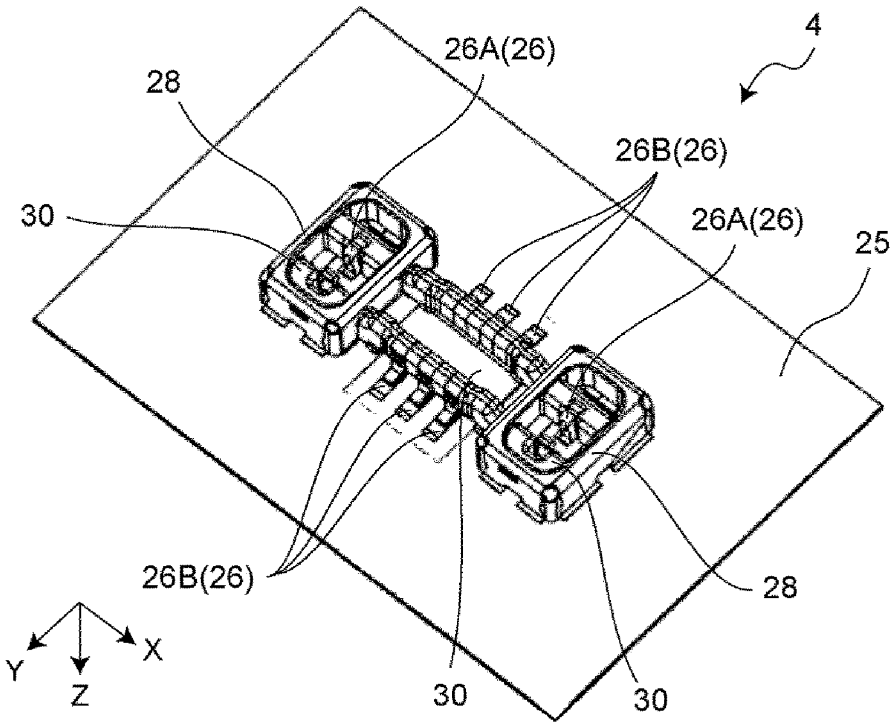
FIG. 2A is a perspective view of an upper surface side of a male multipolar connector according to the embodiment.
Figure 2B:
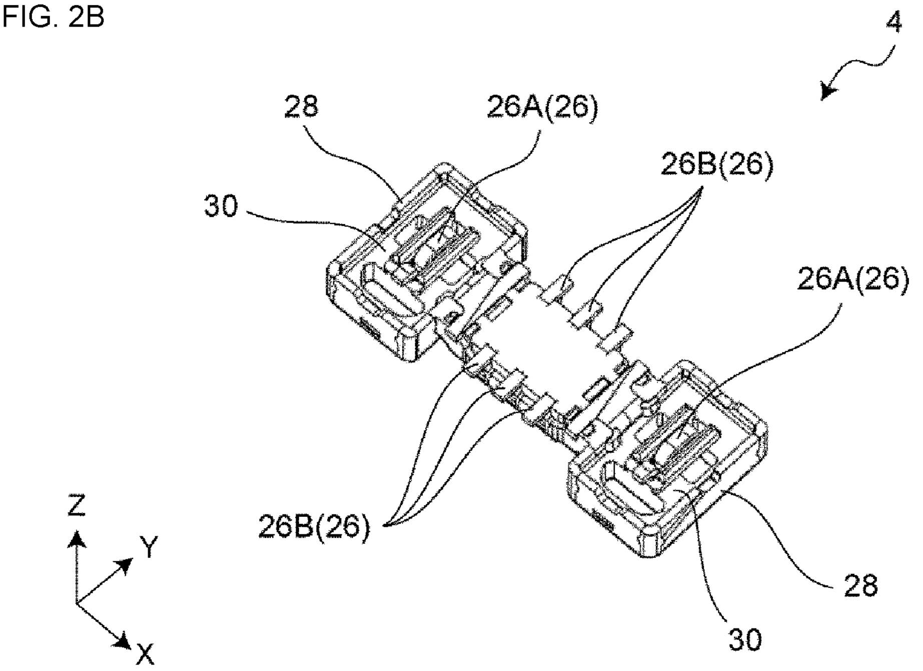
FIG. 2B is a perspective view of a lower surface side of the male multipolar connector according to the embodiment.
Figure 2C:
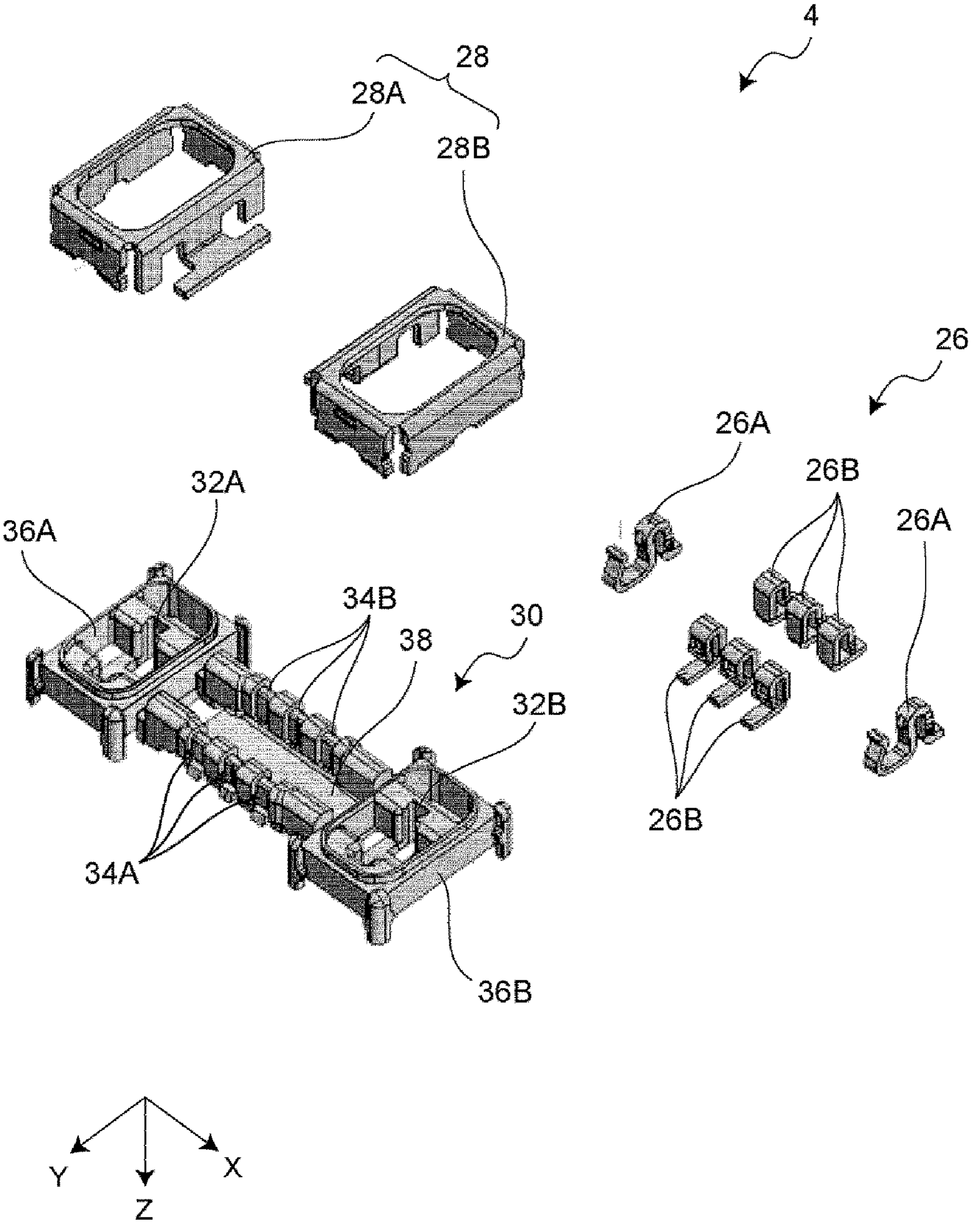
FIG. 2C is an exploded perspective view of the male multipolar connector according to the embodiment.
Figure 3:
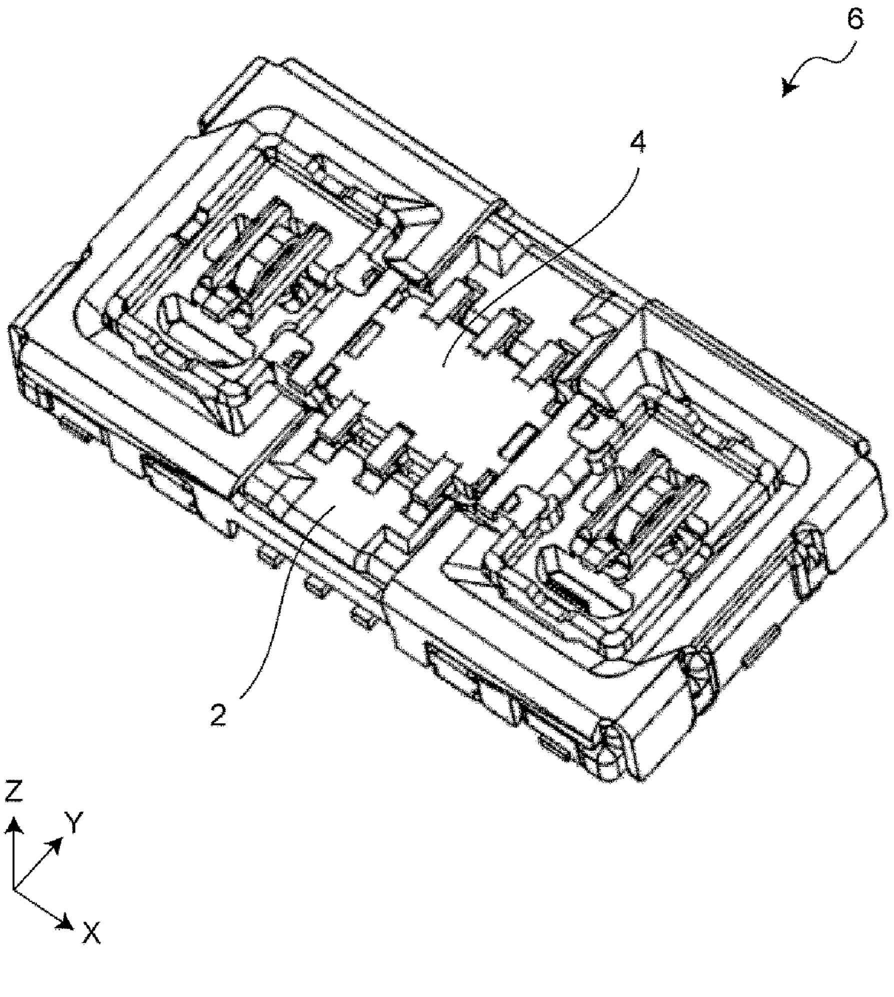
FIG. 3 is a perspective view of a multipolar connector set according to the embodiment.

FIGS. 1A to 1C are drawings illustrating a female multipolar connector 2 according to the embodiment. FIGS. 2A to 2C are drawings illustrating a male multipolar connector 4 according to the embodiment. FIG. 3 is a perspective view illustrating a multipolar connector set 6.

The multipolar connector set 6 illustrated in FIG. 3 is configured by fitting the female multipolar connector 2 illustrated in FIGS. 1A to 1C and the male multipolar connector 4 illustrated in FIGS. 2A to 2C to each other. The female multipolar connector 2 may be referred to as a first connector and the male multipolar connector 4 may be referred to as a second connector.

The female multipolar connector 2 will be described with reference to FIGS. 1A to 1C. FIG. 1A is a perspective view of an upper surface side of the female multipolar connector 2, FIG. 1B is a perspective view of a lower surface side of the female multipolar connector 2, and FIG. 1C is an exploded perspective view of the female multipolar connector 2.

In FIGS. 1A to 1C, a length direction (longitudinal direction) of the female multipolar connector 2 is defined as an X direction, a width direction (short direction) is defined as a Y direction, and a height direction (vertical direction) that is orthogonal to the longitudinal direction and short direction is defined as a Z direction.

As illustrated in FIGS. 1A to 1C, the female multipolar connector 2 includes a plurality of internal terminals 8, a first external terminal 10, and a first insulator 12.

The plurality of internal terminals 8 and the first external terminal 10 are mounted on a substrate 7 illustrated in FIG. 1A. The plurality of internal terminals 8 are electrically connected to respective signal lines (not illustrated) provided on the substrate 7. FIG. 1B and FIG. 1C omit the illustration of the substrate 7.

The internal terminals 8 are terminals that are respectively fitted to and electrically connected with internal terminals 26 of the male multipolar connector 4 that will be described later (see FIGS. 2A to 2C). The internal terminals 8 is made of the mutually-same conductive material (phosphor bronze, for example). There are a plurality of internal terminals 8 and accordingly, the connector 2 illustrated in FIGS. 1A to 1C is referred to as the “multipolar” connector.

The female multipolar connector 2 of the present embodiment includes two types of internal terminals 8 that are first internal terminals 8A and second internal terminals 8B.

The first internal terminals 8A are terminals that are separately provided from the second internal terminals 8B and are independently provided from each other.

Two pieces of first internal terminals 8A are provided in the present embodiment. Specifically, one first internal terminal 8A (also referred to as a first terminal) is provided on one side in the X direction with respect to the second internal terminals 8B and one first internal terminal 8A (also referred to as a second terminal) is provided on the other side in the X direction with respect to the second internal terminals 8B.

The second internal terminals 8B are a plurality of terminals that are provided in a manner to form rows, which is different from the first internal terminals 8A. The plurality of second internal terminals 8B are arranged along the X direction with intervals therebetween. The plurality of second internal terminals 8B are arranged between the above-mentioned two pieces of first internal terminals 8A. In the present embodiment, two rows, extending in the X direction, of the second internal terminals 8B are provided with an interval therebetween in the Y direction.

The first internal terminals 8A and the second internal terminals 8B are connected to signal lines of different frequencies on the substrate 7. In the present embodiment, the first internal terminal 8A is connected to a signal line of a higher frequency than that of the second internal terminal 8B. For example, the first internal terminal 8A is connected to a signal line for transmitting a millimeter wave signal and the second internal terminal 8B is connected to a digital signal line.

As illustrated in FIG. 1C and the like, the first internal terminal 8A is configured as a male terminal. A male terminal is a terminal that is positioned on the inner side portion when being fitted to a female terminal which is a mating terminal. The first internal terminal 8A that is a male terminal has a convex portion and is fitted by the convex portion. On the other hand, the second internal terminal 8B is configured as a female terminal. A female terminal is a terminal that is positioned on the outer side portion when being fitted to a male terminal which is a mating terminal. The second internal terminal 8B that is a female terminal has a concave portion and is fitted by the concave portion.

In fitting based on the concave and convex shapes, the male terminal on the inner side portion does not merely come into contact with the female terminal but is pinched by the female terminal on the outer side portion, exhibiting a strong fitting force. Especially, if a contact force between terminals is small when sending a high frequency signal, a noise is easily generated. Therefore, such concave-convex fitting structure can suppress noise generation.

A female terminal is required to exhibit desired springiness and needs to have a large dimension to some extent so as to accept a male terminal. On the other hand, a male terminal does not have such restriction and is easily reduced in size compared to a female terminal. A height relation and the like of the internal terminals 8 will be described later.

As illustrated in FIG. 1C, a plurality of contact terminals 11 are provided around the first internal terminals 8A. The contact terminals 11 are terminals that are mounted on the substrate 7 and are used for electrically connecting the first external terminal 10 and a second external terminal 28 to the substrate 7. In the present embodiment, the contact terminals 11 are not in direct contact with the first external terminal 10 but are in contact with the second external terminal 28 that is fitted to the first external terminal 10. The contact terminals 11 that are in contact with the second external terminal 28 electrically connect the second external terminal 28 to the substrate 7 and electrically connect the first external terminal 10 to the substrate 7 via the second external terminal 28.

The first external terminal 10 is a terminal that is fitted to and electrically connected with the second external terminal 28 of the male multipolar connector 4 that will be described later (see FIGS. 2A to 2C). The first external terminal 10 functions as a ground terminal. The first external terminal 10 is made of the same conductive material (phosphor bronze, for example) as that of the internal terminal 8 described above.

The first external terminal 10 is configured as a female terminal and has a function of guiding the second external terminal 28, which is a male terminal, inward. As illustrated in FIG. 1C, the first external terminal 10 includes guide portions 21A and 21B that are inclined portions for guiding the second external terminal 28 inward. The first external terminal 10 is the female type and accordingly, the connector 2 illustrated in FIGS. 1A to 1C is referred to as the "female" connector.

The first external terminal 10 has a shape surrounding the first internal terminals 8A described above. As illustrated in FIG. 1C, the first external terminal 10 of the present embodiment has a first portion 10A and a second portion 10B with an interval therebetween in the X direction.

The first portion 10A is a portion surrounding one first internal terminal 8A between the two pieces of first internal terminals 8A. The second portion 10B is a portion surrounding the other first internal terminal 8A between the two pieces of first internal terminals 8A. Here, the "surrounding portion" is not limited to a completely surrounding portion but may be a portion partially having a gap.

One first internal terminal 8A is arranged on the inner side portion of the first portion 10A and the other first internal terminal 8A is arranged on the inner side portion of the second portion 10B. Here, the inner side portion of the first portion 10A and the inner side portion of the second portion 10B are portions that have surfaces directly facing not lateral wall conductors 17, which will be described later, but lateral wall portions of the first portion 10A and second portion 10B respectively to which the lateral wall conductors 17 are connected.

On the other hand, the plurality of second internal terminals 8B are arranged on the outer side portion of the first portion 10A and the outer side portion of the second portion 10B. Here, the outer side portion of the first portion 10A and the outer side portion of the second portion 10B are portions that have surfaces directly facing not the lateral wall portions of the first portion 10A and second portion 10B but the lateral wall conductors 17 which will be described later.

As described above, the first internal terminal 8A is a terminal that transmits a high frequency signal (a millimeter wave signal, for example) compared to the second internal terminal 8B, and easily becomes a noise source. Therefore, the two pieces of first internal terminals 8A are respectively surrounded by the first portion 10A and second portion 10B of the first external terminal 10, being able to suppress an influence of a noise, which is generated by the first internal terminals 8A, on the second internal terminals 8B. Here, the first internal terminals 8A surrounded by the first external terminal 10 do not limitedly send a high frequency signal but may send a low frequency signal.

In the present embodiment, the lateral wall conductors 17 that connect the first portion 10A and the second portion 10B with each other are provided as illustrated in FIG. 1C. The first portion 10A and the second portion 10B are thus connected with each other with the lateral wall conductors 17, forming an annular shape and surrounding the second internal terminals 8B as well as the first internal terminals 8A. Accordingly, a noise generation by the plurality of internal terminals 8 can be suppressed. Here, not limited to the configuration illustrated in FIG. 1C, but the first portion 10A and the second portion 10B may be separately configured.

As illustrated in FIG. 1C, the first portion 10A has protrusion portions 14A that protrude inward in the Y direction at close positions to the second portion 10B. In a similar manner, the second portion 10B has protrusion portions 14B that protrude inward in the Y direction at close positions to the first portion 10A. Each of the protrusion portions 14A and 14B is a portion that extends in the Y direction (the extending direction of the first internal terminal 8A) between the first internal terminals 8A and the second internal terminals 8B in plan view. The provision of the protrusion portions 14A and 14B realizes suppression of interference between the first internal terminals 8A and the second internal terminals 8B. The Y direction is a direction intersecting with the X direction in which the first internal terminals 8A and the second internal terminals 8B face each other, that is, a direction intersecting with the X direction that is an alignment direction of the plurality of second internal terminals 8B in plan view.

As illustrated in FIG. 1C, a gap 16A is formed between a pair of protrusion portions 14A and a gap 16B is formed between a pair of protrusion portions 14B. In the gaps 16A and 16B, a second insulator 30 of the male multipolar connector 4 which will be described later is arranged.

The first external terminal 10 further includes lock portions 19A and 19B. The lock portions 19A and 19B are protrusions that act as stoppers of the second external terminal 28 when the second external terminal 28 is fitted to the first external terminal 10. The lock portions 19A and 19B do not necessarily have to come into contact with the second external terminal 28 in the fitting.

The above-mentioned lock portions 19A and 19B are provided for "mechanical" coupling between the first external terminal 10 and the second external terminal 28, while the above-mentioned contact terminals 11 are provided for "electrical" coupling between the first external terminal 10 and the second external terminal 28. The mechanical coupling and the electrical coupling are thus realized with mutually-different members, increasing flexibility in designing. That is, the designing is realized in which the springiness required in the lock portions 19A and 19B and the contact property required in the contact terminals 11 are separately considered.

The first insulator 12 illustrated in FIGS. 1A to 1C is a member that holds the above-mentioned internal terminals 8 and first external terminal 10 in a manner to electrically insulate the internal terminals 8 and the first external terminal 10 from each other. The first insulator 12 holds at least the first external terminal 10. The first insulator 12 is made of, for example, resin (liquid crystal polymer, for example) that is an insulating material.

The first insulator 12 includes a plurality of terminal holding portions 18A, 18B, 20A, 20B, 22A, and 22B, as illustrated in FIG. 1C.

The terminal holding portion 18A holds one first internal terminal 8A between the two pieces of first internal terminals 8A, and the terminal holding portion 18B holds the other first internal terminal 8A between the two pieces of first internal terminals 8A. The terminal holding portion 20A holds one row of the second internal terminals 8B, and the terminal holding portion 20B holds the other row of the second internal terminals 8B. The terminal holding portion 22A holds the first portion 10A of the first external terminal 10, and the terminal holding portion 22B holds the second portion 10B of the first external terminal 10.

The first insulator 12 further includes a central portion 24. The central portion 24 extends in the X direction on a position between the terminal holding portions 20A and 20B. The central portion 24 holds the plurality of second internal terminals 8B together with the terminal holding portions 20A and 20B.

In the state after assembly illustrated in FIG. 1A, the central portion 24 is arranged in the gaps 16A and 16B of the first external terminal 10. There is a gap between the central portion 24 and the first external terminal 10 and the second insulator 30 of the male multipolar connector 4, which will be described later, is arranged in this gap.

The male multipolar connector 4 will now be described with reference to FIGS. 2A to 2C. FIG. 2A is a perspective view of an upper surface side of the male multipolar connector 4, FIG. 2B is a perspective view of a lower surface side of the male multipolar connector 4, and FIG. 2C is an exploded perspective view of the male multipolar connector 4.

In FIGS. 2A to 2C, the X direction, Y direction, and Z direction of the female multipolar connector 2 described above are shown in association with a length direction (longitudinal direction), a width direction (short direction), and a height direction (vertical direction) of the male multipolar connector 4.

As illustrated in FIGS. 2A to 2C, the male multipolar connector 4 includes the plurality of internal terminals 26, the second external terminal 28, and the second insulator 30.

The plurality of internal terminals 26 and the second external terminal 28 are mounted on a substrate 25 illustrated in FIG. 2A. The plurality of internal terminals 26 are electrically connected to respective signal lines (not illustrated) provided on the substrate 25. FIG. 2B and FIG. 2C omit the illustration of the substrate 25.

The internal terminals 26 are terminals that are respectively fitted to and electrically connected with the internal terminals 8 of the female multipolar connector 2 illustrated in FIGS. 1A to 1C. The internal terminals 26 is made of the mutually-same conductive material (phosphor bronze, for example). There are a plurality of internal terminals 26 and accordingly, the connector illustrated in FIGS. 2A to 2C is referred to as the "multipolar" connector.

The male multipolar connector 4 of the present embodiment includes two types of internal terminals 26 that are third internal terminals 26A and fourth internal terminals 26B.

The third internal terminals 26A are terminals that are respectively fitted to the first internal terminals 8A of the female multipolar connector 2 described above. The fourth internal terminals 26B are terminals that are respectively fitted to the second internal terminals 8B of the female multipolar connector 2. As illustrated in FIG. 2C, the third internal terminals 26A are configured as female terminals and the fourth internal terminals 26B are configured as male terminals.

The third internal terminals 26A are terminals that are separately provided from the fourth internal terminals 26B and are independently provided from each other, as is the case with the first internal terminals 8A.

Two pieces of third internal terminals 26A are provided in the present embodiment. Specifically, one third internal terminal 26A is provided on one side in the X direction with respect to the fourth internal terminals 26B and one third internal terminal 26A is provided on the other side in the X direction with respect to the fourth internal terminals 26B.

The plurality of fourth internal terminals 26B are provided in a manner to form rows, which is different from the third internal terminals 26A. The plurality of fourth internal terminals 26B are arranged along the X direction with intervals therebetween. The plurality of fourth internal terminals 26B are arranged between the above-mentioned two pieces of third internal terminals 26A. In the present embodiment, two rows, extending in the X direction, of the fourth internal terminals 26B are provided with an interval therebetween in the Y direction.

The second external terminal 28 is a terminal that is fitted to and electrically connected with the first external terminal 10 of the female multipolar connector 2 illustrated FIGS. 1A to 1C. The second external terminal 28 functions as a ground terminal. The second external terminal 28 is made of the same conductive material (phosphor bronze, for example) as that of the internal terminal 26 described above.

The second external terminal 28 is configured as a male terminal and is fitted to the first external terminal 10 which is a female terminal. The second external terminal 28 is the male type and accordingly, the connector 4 illustrated in FIGS. 2A to 2C is referred to as the "male" connector.

The second external terminal 28 has a shape surrounding the third internal terminals 26A described above. As illustrated in FIG. 2C, the second external terminal 28 of the present embodiment has a third portion 28A and a fourth portion 28B with an interval therebetween in the X direction.

The third portion 28A is a portion surrounding one third internal terminal 26A between the two pieces of third internal terminals 26A. The fourth portion 28B is a portion surrounding the other third internal terminal 26A between the two pieces of third internal terminals 26A.

As described above, the third internal terminal 26A is a terminal that transmits a high frequency signal (a millimeter wave signal, for example) compared to the fourth internal terminal 26B, and easily becomes a noise source. Therefore, the two pieces of third internal terminals 26A are respectively surrounded by the third portion 28A and fourth portion 28B of the second external terminal 28, being able to suppress an influence of a noise, which is generated by the third internal terminals 26A, on the fourth internal terminals 26B. Here, the third internal terminals 26A surrounded by the second external terminal 28 do not limitedly send a high frequency signal but may send a low frequency signal.

In the present embodiment, the third portion 28A and the fourth portion 28B are separately formed from each other and each of these has an annular shape. The third internal terminals 26A are respectively surrounded by the third portion 28A and the fourth portion 28B annularly, being able to more effectively suppress the interference between the third internal terminals 26A and the fourth internal terminals 26B. Not limited to such configuration, the third portion 28A and the fourth portion 28B may be integrally formed to surround the third internal terminals 26A. However, in the separate configuration, there is no portion coupling the third portion 28A and the fourth portion 28B to each other and accordingly, the width around the fourth internal terminals 26B can be reduced, which is different from the integrated configuration.

The second insulator 30 illustrated in FIGS. 2A to 2C is a member that holds the above-mentioned internal terminals 26 and second external terminal 28 in a manner to electrically insulate the internal terminals 26 and the second external terminal 28 from each other. The second insulator 30 holds at least the second external terminal 28. The second insulator 30 is made of, for example, resin (liquid crystal polymer, for example) that is an insulating material.

The second insulator 30 includes a plurality of terminal holding portions 32A, 32B, 34A, 34B, 36A, and 36B, as illustrated in FIG. 2C. The terminal holding portion 32A holds one third internal terminal 26A between the two pieces of third internal terminals 26A, and the terminal holding portion 32B holds the other third internal terminal 26A between the two pieces of third internal terminals 26A. The terminal holding portions 34A hold one row of the fourth internal terminals 26B, and the terminal holding portions 34B hold the other row of the fourth internal terminals 26B. The terminal holding portion 36A holds the third portion 28A of the second external terminal 28, and the terminal holding portion 36B holds the fourth portion 28B of the second external terminal 28.

The second insulator 30 further includes a central portion 38. The central portion 38 extends in the X direction on a position between the terminal holding portions 34A and 34B. The central portion 38 holds the plurality of fourth internal terminals 26B together with the terminal holding portions 34A and 34B.

The central portion 38 is recessed in the Z direction with respect to the terminal holding portions 34A and 34B. Therefore, a space is generated in a region surrounded by the central portion 38 and the terminal holding portions 34A and 34B. In this space, the central portion 24 of the first insulator 12 of the above-mentioned female multipolar connector 2 is arranged.

According to the above-described configuration, the first internal terminals 8A are arranged on the inner side portion of the first external terminal 10 and the second internal terminals 8B are arranged on the outer side portion of the first external terminal 10, in the female multipolar connector 2. Accordingly, even in sending a high frequency signal to the first internal terminals 8A, it is possible to suppress an infection of a noise, which is generated by the first internal terminals 8A, on the second internal terminals 8B and suppress inter-terminal interference between the internal terminals 8A and 8B. The male multipolar connector 4 is also capable of exerting a similar advantageous effect.

Further, the first internal terminals 8A are the male type and the second internal terminals 8B are the female type, thereby being able to reduce the sizes of the first internal terminals 8A compared to the second internal terminals 8B and also reduce the size of the first external terminal 10 in which the first internal terminals 8A are arranged. Accordingly, size reduction, especially, height reduction of the female multipolar connector 2 can be realized.

The multipolar connector set 6 illustrated in FIG. 3 is configured by fitting the above-mentioned male multipolar connector 4 to the female multipolar connector 2. When the male multipolar connector 4 is fitted to the female multipolar connector 2, the second external terminal 28 (male type) of the male multipolar connector 4 is fitted to the first external terminal 10 (female type) of the female multipolar connector 2. Further, the third internal terminals 26A (female type) of the male multipolar connector 4 are fitted to the first internal terminals 8A (male type) of the female multipolar connector 2. Furthermore, the fourth internal terminals 26B (male type) of the male multipolar connector 4 are fitted to the second internal terminals 8B (female type) of the female multipolar connector 2. However, the above-mentioned fitting order can be changed as appropriate.

In the above-mentioned fitting, there is a case where when fitting the third internal terminals 26A of the male multipolar connector 4 to the first internal terminals 8A of the female multipolar connector 2, the second external terminal 28 positioned around the third internal terminal 26A erroneously hits the first internal terminal 8A and the first internal terminal 8A is damaged.

Therefore, height positions of respective members of the female multipolar connector 2 are adjusted so as to suppress damaging of the first internal terminal 8A, in the present embodiment. This will be specifically described with reference to FIGS. 4 and 5.

Figure 4:
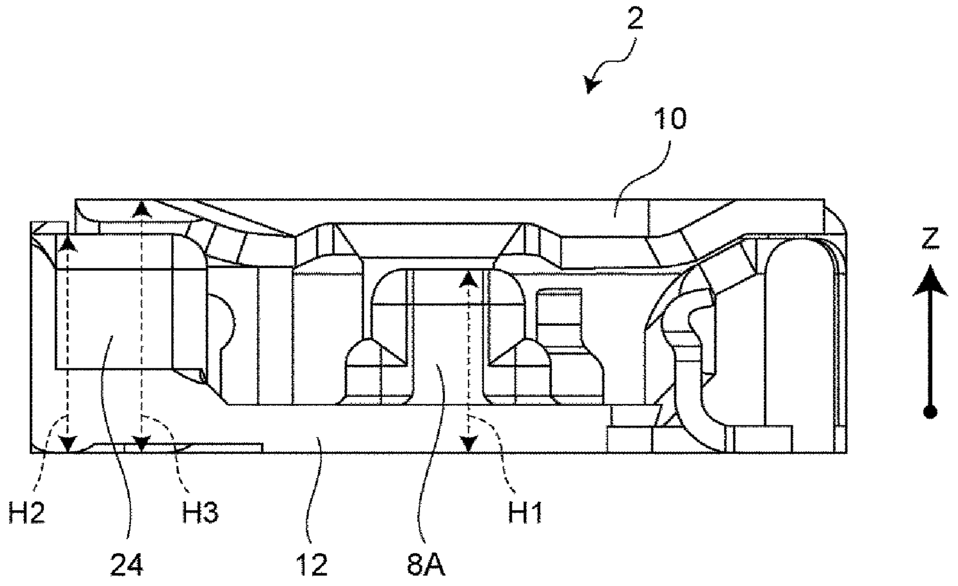
FIG. 4 is a sectional view illustrating a height relation among members of the female multipolar connector according to the embodiment.
Figure 5:
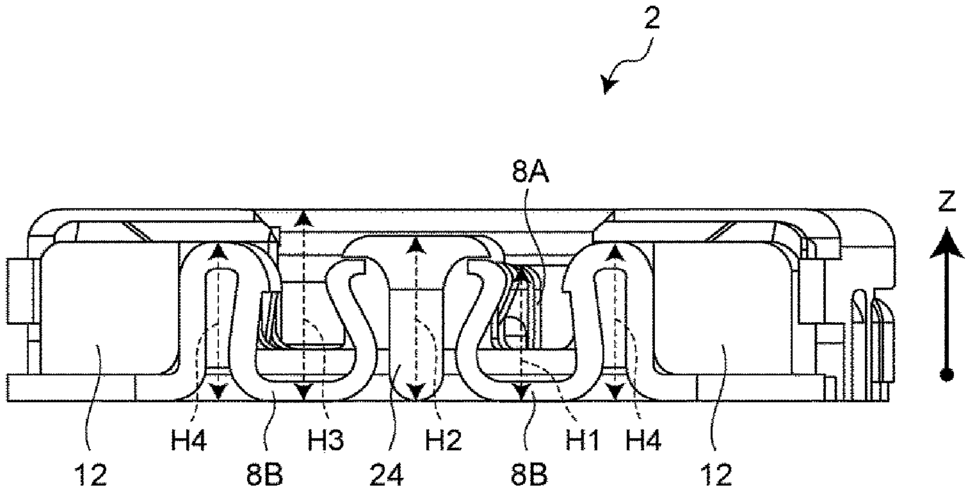
FIG. 5 is a sectional view illustrating a height relation among members of the female multipolar connector according to the embodiment.

FIG. 4 is a vertical sectional view of the female multipolar connector 2 taken at a position including the first internal terminal 8A and FIG. 5 is a vertical sectional view of the female multipolar connector 2 taken at a position including the second internal terminals 8B.

As illustrated in FIG. 4, the first internal terminal 8A has a height H1, the central portion 24 of the first insulator 12 has a height H2, and the first external terminal 10 has a height H3, in the present embodiment. The heights used here are heights of the highest positions of respective members. The relation among the height H1, the height H2, and the height H3 is set as H1<H2<H3, as illustrated in FIG. 4.

By setting the height H1 of the first internal terminal 8A to be lower than the height H3 of the first external terminal 10, the second external terminal 28 of the male multipolar connector 4 can be preferentially brought into contact with the first external terminal 10 when the male multipolar connector 4 is brought close to the female multipolar connector 2. This makes it hard for the second external terminal 28 to hit the first internal terminal 8A, being able to suppress damaging of the first internal terminal 8A. Further, the first external terminal 10 includes the guide portions 21A and 21B and therefore, a fitting position can be corrected even when the second external terminal 28 is deviated in some measure in fitting.

The first internal terminals 8A are the male type in the present embodiment. A male terminal can be easily reduced in size compared to a female terminal and the height H1 can be accordingly reduced. Therefore, the height H3 of the first external terminal 10 that needs to be higher than the first internal terminal 8A can be also reduced. The height H3 of the first external terminal 10 that is the highest in the female multipolar connector 2 is reduced, thereby realizing the reduction in height of the female multipolar connector 2. The reduction in height of the female multipolar connector 2 realizes reduction in height of the multipolar connector set 6 illustrated in FIG. 3 and realizes reduction in inductor components in fitting, being able to increase self resonant frequencies of the first external terminal 10 and the second external terminal 28. This makes it possible to suppress entry of the self resonant frequencies into operating frequency ranges of the connectors 2 and 4 and improve frequency characteristics of the connectors 2 and 4.

The above-mentioned configuration realizes suppression in damaging of the first internal terminal 8A and the reduction in height of the female multipolar connector 2.

Further, the height H1 of the first internal terminal 8A is set to be lower than the height H2 of the central portion 24 of the first insulator 12, thereby making it harder for the second external terminal 28 of the male multipolar connector 4 to hit the first internal terminal 8A when the male multipolar connector 4 is brought close to the female multipolar connector 2. Accordingly, damaging of the first internal terminal 8A can be further suppressed.

Further, by setting the height H2 of the central portion 24 of the first insulator 12 to be lower than the height H3 of the first external terminal 10, the second external terminal 28 of the male multipolar connector 4 can be preferentially brought into contact with the first external terminal 10 when the male multipolar connector 4 is brought close to the female multipolar connector 2. This makes it harder for the second external terminal 28 to hit the first internal terminal 8A, being able to further suppress damaging of the first internal terminal 8A.

The second internal terminal 8B has a height H4, as illustrated in FIG. 5. In the present embodiment, the height H1 of the first internal terminal 8A is set to be lower than the height H4 of the second internal terminal 8B. Male terminals are employed as the first internal terminals 8A, female terminals are employed as the second internal terminals 8B, and the height H1 of the first internal terminal 8A which is the male type and is easily reduced in size is thus set low, making it harder for the second external terminal 28 of the male multipolar connector 4 to come into contact with the first internal terminal 8A. Accordingly, damaging of the first internal terminal 8A can be further suppressed.

Omitted the illustration, the height of the third internal terminal 26A is similarly set to be lower than the height of the second external terminal 28 also in the male multipolar connector 4 illustrated in FIGS. 2A to 2C. Accordingly, damaging of the third internal terminal 26A can be suppressed.

As described above, the female multipolar connector 2 of the embodiment includes the first internal terminals 8A, the second internal terminals 8B, the first external terminal 10, and the first insulator 12. The first internal terminals 8A are the male type and are arranged on the inner side portion of the first external terminal 10, and the second internal terminals 8B are the female type and are arranged on the outer side portion of the first external terminal 10. The first insulator 12 holds at least the first external terminal 10. Further, the height H3 of the first external terminal 10 is greater than the height H1 of the first internal terminal 8A and the first external terminal 10 is the female type.

Thus, the first internal terminals 8A are arranged on the inner side portion of the first external terminal 10 and the second internal terminals 8B are arranged on the outer side portion of the first external terminal 10, making it possible to suppress an influence of a noise, which is generated by the first internal terminals 8A, on the second internal terminals 8B even in sending a high frequency signal to the first internal terminals 8A. Accordingly, the inter-terminal interference between the internal terminals 8A and 8B can be suppressed. Further, by setting the height H3 of the first external terminal 10 to be greater than the height H1 of the first internal terminal 8A, the second external terminal 28 of the male multipolar connector 4 preferentially comes into contact with the first external terminal 10 of the female multipolar connector 2 when the male multipolar connector 4 is fitted to the female multipolar connector 2. This makes it hard for the second external terminal 28 of the male multipolar connector 4 to hit the first internal terminal 8A, being able to suppress damaging of the first internal terminal 8A. Further, the first internal terminal 8A that is the male type is employed and therefore, springiness does not need to be secured compared to the female type, being able to reduce the height H1. The reduction in the height H1 of the first internal terminal 8A realizes reduction in the height H3 of the first external terminal 10 that needs to be higher than the first internal terminal 8A, being able to reduce the entire height of the female multipolar connector 2. Thus, the reduction in height of the female multipolar connector 2 can be realized.

In the female multipolar connector 2 of the embodiment, the first internal terminal 8A is connected to a signal line that transmits a signal of a higher frequency than that of the second internal terminal 8B. A terminal transmitting a high frequency signal easily becomes a noise source. However, as the first external terminal 10 surrounds the first internal terminals 8A, which transmit a higher frequency signal than the second internal terminals 8B, the interference from the first internal terminals 8A to the second internal terminals 8B can be effectively suppressed.

In the female multipolar connector 2 of the embodiment, the first internal terminal 8A is connected to a signal line that transmits a millimeter wave signal. Here, the millimeter wave signal is a signal having a frequency in a range from 30 GHz to 300 GHz. The first internal terminal 8A thus transmits a millimeter wave signal, realizing transmission of a large capacity of signal. A terminal transmitting a millimeter wave signal especially easily generates a noise. However, the first external terminal 10 at least partially surrounds the first internal terminals 8A and therefore, the interference from the first internal terminals 8A to the second internal terminals 8B can be effectively suppressed.

In the female multipolar connector 2 of the embodiment, the first external terminal 10 includes the protrusion portions 14A and 14B extending in the Y direction between the first internal terminals 8A and the second internal terminals 8B in plan view. Accordingly, a space for arranging the second insulator 30 and the like of the male multipolar connector 4 can be secured between the first internal terminals 8A and the second internal terminals 8B while effectively suppressing the interference between the first internal terminals 8A and the second internal terminals 8B.

The multipolar connector set 6 of the embodiment includes the female multipolar connector 2 and the male multipolar connector 4 that is fitted to the female multipolar connector 2. The male multipolar connector 4 includes the third internal terminals 26A, the fourth internal terminals 26B, the second external terminal 28, and the second insulator 30. The third internal terminals 26A are the female type and are respectively fitted to the first internal terminals 8A. The fourth internal terminals 26B are the male type and are respectively fitted to the second internal terminals 8B. The second external terminal 28 is the male type and is fitted to the first external terminal 10. The height of the second external terminal 28 is greater than the height of the third internal terminal 26A.

This configuration can exert a similar advantageous effect to that of the above-mentioned female multipolar connector 2.

The present disclosure has been described above with reference to the above-described embodiment, but the present disclosure is not limited to the above-described embodiment. For example, the numbers of internal terminals and external terminals may be optional.

While the present disclosure has been sufficiently described in relation to the preferred embodiment with reference to the accompanying drawings, various modifications and revisions are evident for those skilled in the art. These modifications and revisions should be construed as being included in the scope of the present disclosure based on the attached claims in a range not deviating from that range. Also, a combination or a change in sequence of the components in each embodiment can be achieved without deviating from the scope and idea of the present disclosure.

Here, the advantageous effect of each embodiment can be achieved by appropriately combining any of the above-described various embodiments.

The present disclosure is applicable to any female multipolar connector and any multipolar connector set.

What is claimed is:

1. A female multipolar connector comprising:

a first internal terminal;

a second internal terminal;

a first external terminal having a first portion; and a first insulator that holds the first external terminal, wherein the first internal terminal is a male type and is arranged on an inner side portion of the first portion of the first external terminal, the second internal terminal is a female type and is arranged on an outer side portion of the first portion of the first external terminal, a height of the first external terminal is greater than a height of the first internal terminal, the first external terminal is the female type, and the first external terminal surrounds both of the first and second internal terminals.

2. The female multipolar connector according to claim 1, wherein the height of the first internal terminal is lower than a height of the first insulator.

3. The female multipolar connector according to claim 2, wherein the height of the first insulator is lower than the height of the first external terminal.

4. The female multipolar connector according to claim 2, wherein the height of the first internal terminal is lower than a height of the second internal terminal.

5. The female multipolar connector according to claim 2, wherein the first internal terminal is connected to a signal line that transmits a signal of a higher frequency than that of the second internal terminal.

6. The female multipolar connector according to claim 2, wherein the first internal terminal is connected to a signal line that transmits a millimeter wave signal.

7. The female multipolar connector according to claim 2, wherein the first external terminal includes a protrusion portion extending in an extending direction of the first internal terminal between the first internal terminal and the second internal terminal in plan view in a height direction of the first internal terminal.

8. A multipolar connector set comprising:

the female multipolar connector according to claim 2; and a male multipolar connector that is fitted to the female multipolar connector, wherein the male multipolar connector includes a third internal terminal that is the female type and is fitted to the first internal terminal, a fourth internal terminal that is the male type and is fitted to the second internal terminal, a second external terminal that is the male type and is fitted to the first external terminal, and a second insulator that holds the third internal terminal, the fourth internal terminal, and the second external terminal, and a height of the second external terminal is greater than a height of the third internal terminal.

9. The female multipolar connector according to claim 1, wherein a height of the first insulator is lower than the height of the first external terminal.

10. The female multipolar connector according to claim 9, wherein the height of the first internal terminal is lower than a height of the second internal terminal.

11. The female multipolar connector according to claim 9, wherein the first internal terminal is connected to a signal line that transmits a signal of a higher frequency than that of the second internal terminal.

12. The female multipolar connector according to claim 9, wherein the first internal terminal is connected to a signal line that transmits a millimeter wave signal.

13. The female multipolar connector according to claim 9, wherein the first external terminal includes a protrusion portion extending in an extending direction of the first internal terminal between the first internal terminal and the second internal terminal in plan view in a height direction of the first internal terminal.

14. A multipolar connector set comprising:

the female multipolar connector according to claim 9; and a male multipolar connector that is fitted to the female multipolar connector, wherein the male multipolar connector includes a third internal terminal that is the female type and is fitted to the first internal terminal, a fourth internal terminal that is the male type and is fitted to the second internal terminal, a second external terminal that is the male type and is fitted to the first external terminal, and a second insulator that holds the third internal terminal, the fourth internal terminal, and the second external terminal, and a height of the second external terminal is greater than a height of the third internal terminal.

15. The female multipolar connector according to claim 1, wherein the height of the first internal terminal is lower than a height of the second internal terminal.

16. The female multipolar connector according to claim 15, wherein the first internal terminal is connected to a signal line that transmits a signal of a higher frequency than that of the second internal terminal.

17. The female multipolar connector according to claim 1, wherein the first internal terminal is connected to a signal line that transmits a signal of a higher frequency than that of the second internal terminal.

18. The female multipolar connector according to claim 1, wherein the first internal terminal is connected to a signal line that transmits a millimeter wave signal.

19. The female multipolar connector according to claim 1, wherein the first external terminal includes a protrusion portion extending in an extending direction of the first internal terminal between the first internal terminal and the second internal terminal in plan view in a height direction of the first internal terminal.

20. A multipolar connector set comprising:

the female multipolar connector according to claim 1; and a male multipolar connector that is fitted to the female multipolar connector, wherein the male multipolar connector includes a third internal terminal that is the female type and is fitted to the first internal terminal, a fourth internal terminal that is the male type and is fitted to the second internal terminal, a second external terminal that is the male type and is fitted to the first external terminal, and a second insulator that holds the third internal terminal, the fourth internal terminal, and the second external terminal, and a height of the second external terminal is greater than a height of the third internal terminal.

21. The female multipolar connector according to claim 1, wherein the first portion of the first external terminal includes a protrusion portion extending in a direction intersecting with a direction in which the first and second internal terminals face each other in plan view in a height direction of the first internal terminal.

22. A multipolar connector comprising:

a first internal terminal;

a second internal terminal, the first and second internal terminals facing each other in a first direction;

a first external terminal having a first portion; and a first insulator that holds the first external terminal, wherein the first internal terminal is arranged on an inner side portion of the first portion of the first external terminal, the second internal terminal is arranged on an outer side portion of the first portion of the first external terminal, a height of the first external terminal is greater than a height of the first internal terminal, and the first external terminal surrounds both of the first and second internal terminals.

23. The multipolar connector according to claim 22, wherein the first portion of the first external terminal includes a protrusion portion extending in a second direction intersecting with the first direction in plan view in a height direction of the first internal terminal.

24. The multipolar connector according to claim 22, wherein the first internal terminal has a mounting portion extending in a second direction intersecting with the first direction and a contact surface facing toward the mounting portion;

the second internal terminal has a plurality of terminals in at least two rows along the first direction, each of the plurality of terminals having a mounting portion extending in the second direction and a contact surface facing inwardly and away from the mounting portion; and the first external terminal has a contact surface facing inwardly.

25. The multipolar connector according to claim 22, wherein the first internal terminal has a mounting portion extending in a second direction intersecting with the first direction and a contact surface facing toward the mounting portion;

the second internal terminal has a plurality of terminals in at least two rows along the first direction, each of the plurality of terminals having a mounting portion extending in the second direction and a contact surface facing inwardly and away from the mounting portion; and the first external terminal is configured such that a mating external terminal is arranged inward thereof.

26. The multipolar connector according to claim 22, wherein a height of the first insulator is lower than the height of the first external terminal.

* * * * *